UNITED STATES PATENT OFFICE.

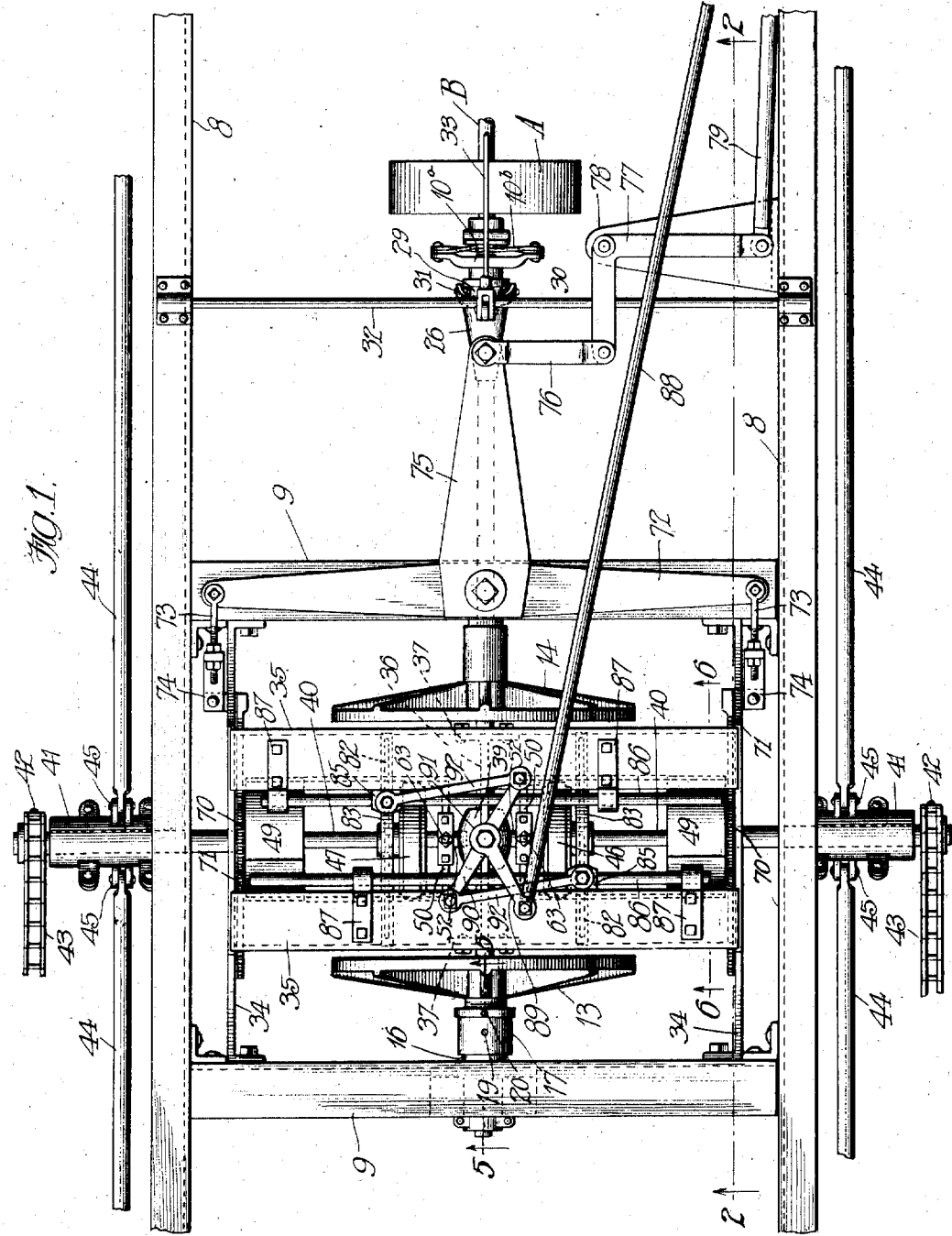

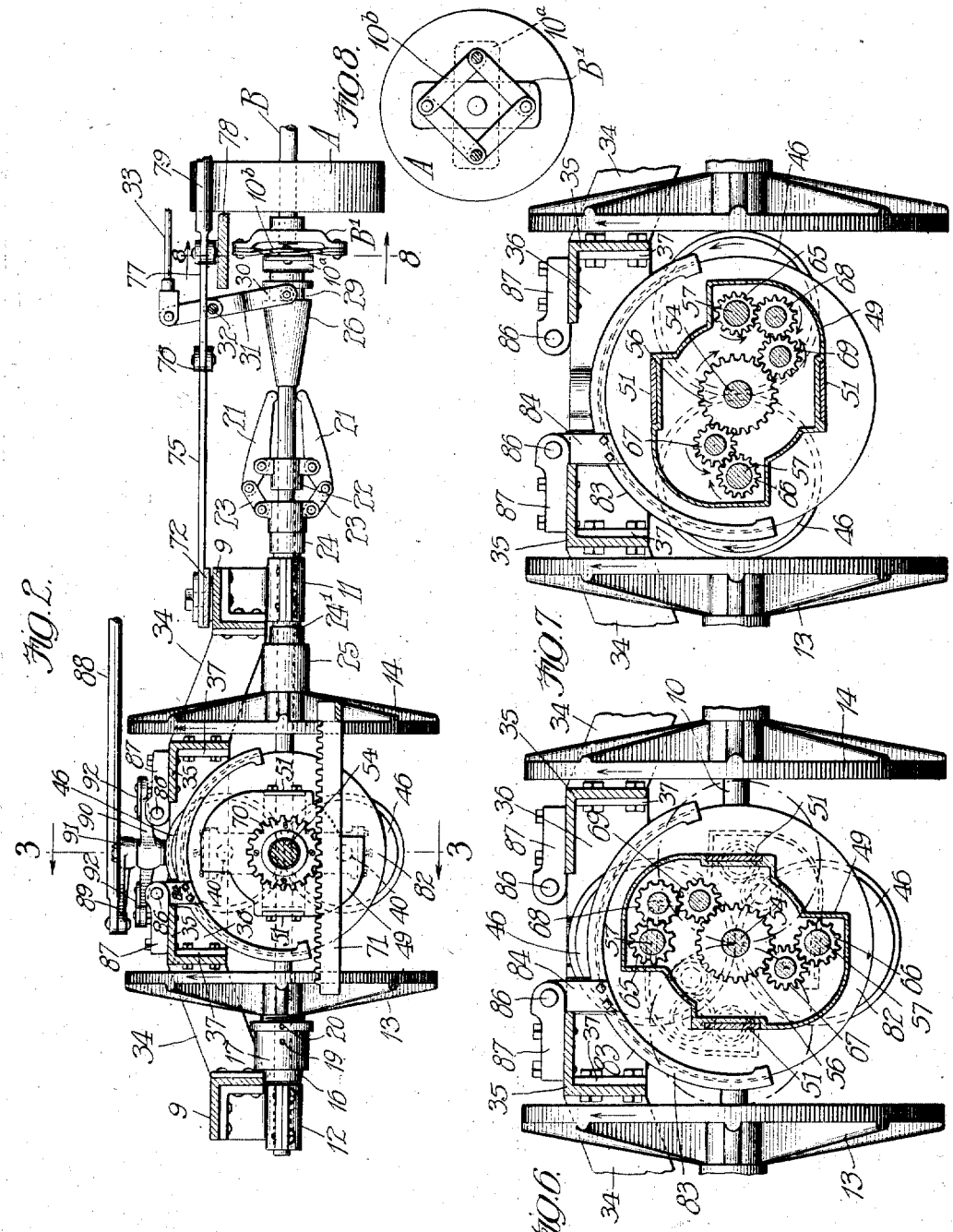

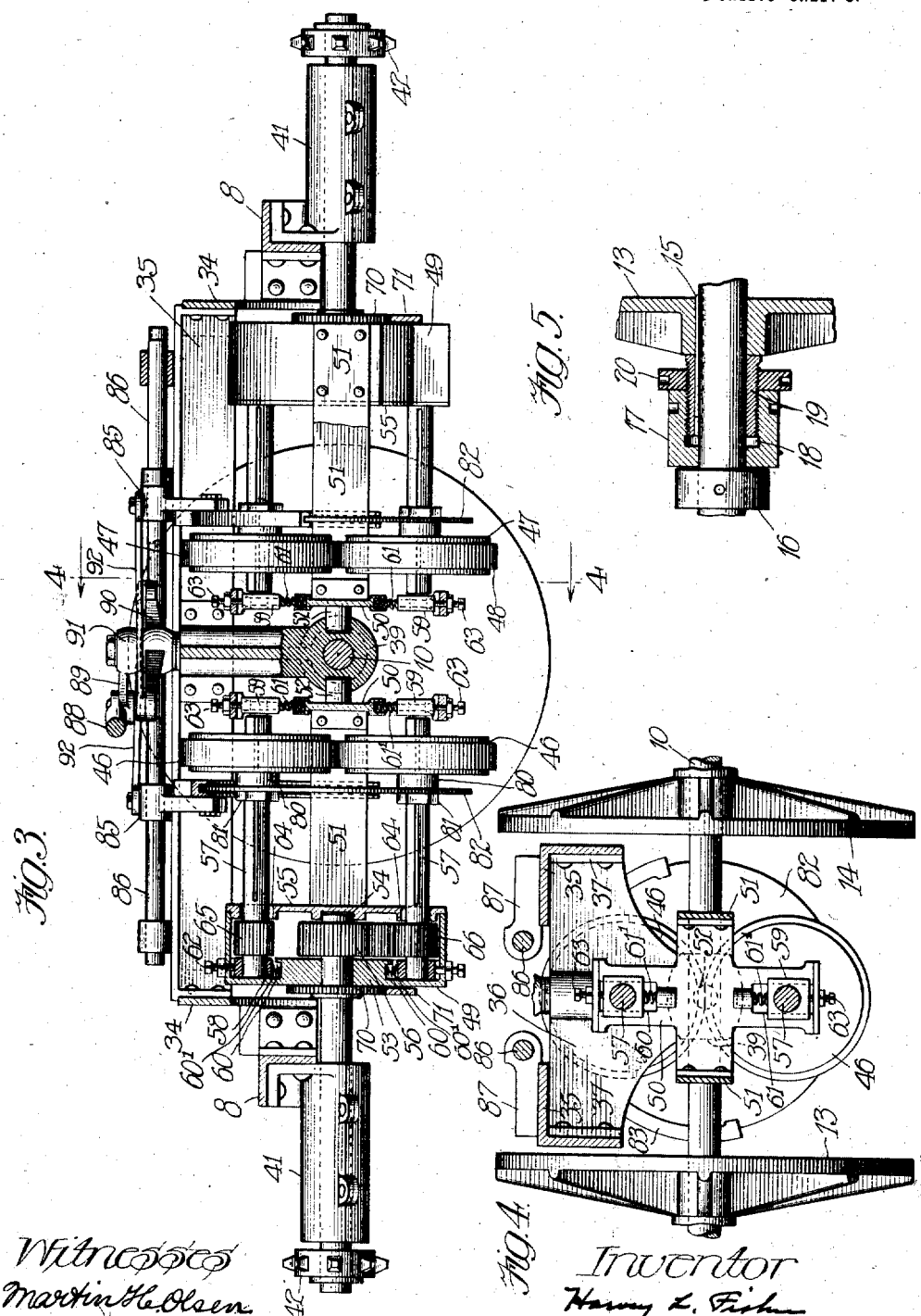

HARVEY L. FISHER, OF CHICAGO, ILLINOIS, ASSIGNOR TO DONALDSON & FISHER COMPANY, OF CHICAGO, ILLINOIS, A CORPORATION OF ARIZONA.

TRANSMISSION MECHANISM FOR AUTOMOBILES.

1,234,000. Specification of Letters Patent. Patented July 17, 1917.

Application filed June 15, 1912. Serial No. 703,920.

*To all whom it may concern:*

Be it known that I, HARVEY L. FISHER, a citizen of the United States, residing at Chicago, in the county of Cook and State of Illinois, have invented certain new and useful Improvements in Transmission Mechanism for Automobiles, of which the following is a specification.

My invention relates more particularly to transmission mechanism of the friction class which, as is well known, have the advantage of great flexibility or adjustability but the disadvantage of somewhat reduced efficiency, as compared to transmission mechanism involving positive connections as by toothed gearing, by reason of the friction due in large part to unbalanced pressure between the coöperating elements. In my improved form of transmission mechanism, however, this disadvantage is eliminated by reason of the evenly balanced pressure distribution without sacrificing any of the advantages of frictional transmission mechanism set out above. Other advantages of the invention will appear from the following detailed description and the drawings accompanying and forming a part of this application. But it will be understood that the particular form of machines in connection with which my invention is disclosed, is illustrated and described in detail for the purpose of exemplification only, though it is my preferred form, and my invention is not limited to this particular embodiment, but embraces other modifications and forms coming substantially within the scope of the following claims.

Referring to the drawings alluded to above, Figure 1 is a plan view of so much of the body of a vehicle as it is necessary to illustrate for the explanation of my invention having the latter applied thereto; Fig. 2 is a vertical section upon the line 2—2 of Fig. 1; Fig. 3 is a vertical section perpendicular to the plane of Fig. 2 upon the line 3—3 of that figure but on an enlarged scale; Fig. 4 is a vertical section upon the plane of the line 4—4 of Fig. 3, showing, however, certain parts to be referred to hereinafter in elevation; Fig. 5 is a detailed vertical section upon the line 5—5 of Fig. 1 but on an enlarged scale; Fig. 6 is a vertical section upon the plane of the line 6—6 of Fig. 1; Fig. 7 is a similar view but with the parts shown in a different position; and Fig. 8 is a section on line 8—8 of Fig. 2, looking in the direction of the arrows. The same reference symbols are applied to the various parts wherever they are found in the drawings.

In the particular embodiment of my invention shown in the drawings, the frame work or chassis of the vehicle is partially shown in Fig. 1, in which the side bars are shown at 8, 8 connected by cross bars 9, 9 which support the transmission mechanism. The engine is not shown except for the fly wheel A and shaft B thereof but may be of any approved type connected up in any usual or approved way to the drive shaft 10 which extends centrally and longitudinally of the frame beneath the cross bars or angle irons 9, 9 on which it is mounted by the front and rear bearings 11, 12 respectively. In Figs. 2 and 8 I have shown a satisfactory connection between the shafts B and 10 consisting of the cross-heads 10ª and B' on the respective shafts connected by the links 10ᵇ. Upon the drive shaft 10 and between the cross bars 9, 9 are mounted a pair of friction disks 13, 14 of which the rear member 13 is adjustably keyed to the shaft by a spline 15 (Fig. 5) and adjusted longitudinally with relation to a fixed collar 16 pinned to the shaft by means of a loose collar 17, counterbored at 18, and tapped to receive a threaded sleeve 19, the parts being locked when adjusted by a lock nut 20. A certain amount of play is by this means permitted the disk 13 but its thrust in the direction of the rear end of shaft is adjustably limited by the means described.

The forward member 14 of the pair of disks is likewise splined upon the driving shaft and permitted a certain longitudinal movement thereof but within limits, and it may be forced toward its companion disk by mechanism to be now described. A pair of levers 21, 21 are pivoted upon a collar 22 which is pinned to the shaft, and at their rearward ends are connected by links 23, 23 to a collar 24 upon a thrust tube 24' which surrounds the driving shaft within the bearing 11 and extends beyond the same into contact with the hub 25 of said forward disk. The forwardly extending longer arms of the levers normally rest against the shaft, and are rounded at their ends to permit the entrance between them of a conical sleeve 26, which is adjustable along the power shaft and provided with a groove 29 in which are received the anti-friction rollers 30 of the yoke lever 31 which is pivoted to a cross rod 32 and provided at its other end with a link 33 connected to a suitable manipulating handle within reach of the driver of the machine. It will now be apparent that when the cone sleeve 26 is thrust rearwardly by the operator it forces the longer arms of the lever 21 apart and through the links 23 and the thrust tube 24 forces the forward disk in a rearward direction. The purpose and function of this construction will appear later.

Connecting the cross pieces 9, 9 near the opposite ends thereof, and parallel to the side bars 8, 8 is a pair of bridge pieces 34, 34 which are somewhat raised or arched at their center as shown in Fig. 2, and a pair of angle irons 35, 35 are connected across the bridge pieces between the friction disks 13, 14 and supports the parts of the adjusting and reversing mechanism as will appear below. At the center of the angle irons 35, 35 and in the plane of the driving shaft, a casting 36 is bolted to the angle irons and is formed at its lower edge with a hub 39 which is bored transversely to receive and support the driving shaft 10 at this point. The shafts 40, 40 which are driven by the transmission mechanism are mounted in bearings 41, 41 bolted to the side rails 8, 8 as shown more particularly in Fig. 3 and formed of two longitudinal sections as is common with bearings of this character. At their outer ends the shafts 40, 40 carry sprocket wheels 42, 42 which receive the sprocket chains 43, 43 by which the traction wheels are driven in the usual manner. If desired for greater strength brace rods 44, 44 may be pivoted to lugs 45, 45 upon the journal and attached to some rigid part of the same.

The frictional means which I employ for coöperating with the friction disks for transmitting the motion from the drive shaft to the sectional shafts is capable of adjustment toward and from the center of the friction disks for the purpose of regulating the speed of the vehicle and may be thrown out of action entirely or reversed at will. To provide for these various operations the friction means includes two pairs of friction rollers 46, 46, 47, 47 located respectively on opposite sides of the centers of the disks and adapted to coöperate therewith, being provided with surfaces 48, 48 of any well known or approved material for this purpose. In order that the friction rollers may be thrust into and out of contact with the friction disks and reversed at will, each pair thereof is mounted in a revoluble frame comprising a gear housing 49, 49, a journal housing 50, 50 and longitudinally connecting members 51, 51. These two revoluble frames are formed or provided at their inner ends with arbors 52, 52 which are journaled in the bearings in the hub 39 before mentioned, (see Fig. 3) and at their outer ends are revolubly mounted or journaled upon the inner ends of the shafts 40, 40 which are extended within the side rails of the chassis for this purpose. The outer wall of each gear housing is somewhat thickened as at 53 to form a substantial bearing upon the shaft which as seen in Fig. 3 projects through the housing and is received at its inner end in a seat or bearing 54 in the inner wall 55, a gear 56 being pinned or keyed to said shaft intermediate the walls for a purpose which will appear.

The friction rollers 46, 47 in each frame are splined or keyed upon a pair of shafts 57, 57 which are mounted at their opposite ends in spring pressed adjustable bearings 58, 59 carried in ways 60, 61 formed in the outer wall of the gear housing and in the bearing housing respectively. Springs 60′, 61′ normally force the ends of the shafts outward, and adjusting screws 62, 63 limit their outward movement. The splined shafts 57, 57 enter into the housing 49, through longitudinal openings 64, 64 which permit a slight movement of said shafts toward and from the center of said housing and within the housing each shaft is provided with a pinion 65, 66 (see Figs. 3, 6 and 7). Between one of these pinions 66 and the gear 56 upon the inner end of the sectional shaft is interposed a single idler gear 67, while between the other such pinion 65 and the gear upon the sectional shaft is interposed a pair of idler gears 68, 69 to transmit motion from the friction rollers to said shaft the intermediate gear being such that the oppositely rotating friction rollers of each pair will tend to drive the shaft in the same direction under all circumstances. For the purpose of rotating the pivoted frames to throw the friction rolls into and out of contact with the disks and to reverse the direction of the same, the pivoted frames are provided on their outer faces with gear wheels 70, 70 which are fixed thereto, and actuated by longitudinally moving rack bars 71, 71 which are propelled in opposite directions from each other by a lever 72 pivoted centrally of the forward cross bar 9 and adustably connected to said racks by eye-bolts 73, 73 and angle pieces 74, 74 (see Figs. 1, 2 and 3). The lever 72 is formed with or connected to a forwardly extending arm 75, which is connected by a link 76 with a bell crank 77, mounted upon a bracket 78 projecting from the side bar 8, and to the other arm of said bell crank is connected the operating rod 79, which may be connected to any suitable handle or lever within reach of the operator of the vehicle (see Fig. 1). It will now be apparent that through the connections described the lever 72 may be shifted or swung about its pivot whereby the racks are reciprocated in opposite directions from each other and the pivoted roll-carrying frames with which they respectively engage, shifted correspondingly to either start or stop the vehicle or to reverse its direction of movement.

In order to shift the pairs of rolls toward and from the centers of the friction disks and thereby control the speed of the vehicle, said disks are provided with outwardly projecting hubs 80, 80 reduced at their outer ends to receive perforated disks 82, 82 which are mounted upon the shafts 57, 57 and the side bars 51, 51 for longitudinal movement with relation to the same. Nuts 81, 81 upon the hubs 80, 80 secure the disks in place. In order to shift these adjusting disks toward and from the centers of the friction disks the former are partially encircled at their peripheries by grooved arcuate pieces 83, 83 which are supported from arms 84, 84 projecting from sleeves 85, 85 pinned to transverse rods 86, 86 sliding in guide eyes 87, 87 mounted upon the angle irons 35, 35 (see Fig. 1). The sliding rods are in turn adjusted by a rod 88, under control of the operator which is connected to an arm 89 rigid with a lever 90 pivoted to the central casting 36 at 91 and connected to sleeves 85, 85 on said sliding rods by the links 92, 92. It will be apparent that by shifting rod 88 the operator can swing the lever 90 and through the sliding rods 86, 86 and their connections to the disks 82, 82 shift the friction rolls toward and from the centers of the friction disks and so regulate the speed of the vehicle.

The diameter of the friction rolls is substantially one-half the distance between the friction disks so that when the former are swung to bring the line connecting their centers substantially into the horizontal position, the rolls of each pair will be in contact with each other and with the adjacent disks, see dotted lines Fig. 6. The pressure between these elements at the time the friction rolls are shifted is limited to an extent by the necessity of operating them by hand against the friction occasioned by such pressure. For this reason and in order to increase the frictional pressure to any amount desired, I have provided the means for shifting the forward friction disk with reference to the rear friction disk heretofore described. In operating the vehicle the handle or lever controlling the rod 33 for shifting the cone sleeve 36 and controlling the pressure between the disks will be released before the frame carrying friction rollers is swung about its pivot and before the adjustment of the rollers radially of the friction disks for the purpose of testing the speed.

It will now be apparent that my invention provides a perfectly balanced construction obviating all side spring or pressure and consequent friction and wear upon the bearings and that the thrust of the friction disks will be taken up upon the motor shaft itself so that there is absolutely no end thrust resulting from the transmission mechanism imparted to the bearings of shaft.

I claim:

1. A power transmission mechanism for automobiles and the like comprising a shaft, a pair of friction disks secured thereto for revolution therewith, friction rollers simultaneously engaging each disk on opposite sides of the center thereof, and power transmitting means connected to the shaft and friction means respectively.

2. In a power transmission mechanism for automobiles and the like, a shaft, a pair of opposed friction disks mounted on the shaft, and transmitting their end thrust to the shaft in opposite directions, friction rollers simultaneously engaging each disk on opposite sides of the center thereof, and power transmission means connected to the shaft and the friction rollers respectively.

3. In a power transmission mechanism, a shaft, a pair of opposed friction disks mounted on the shaft and adjustable toward and from each other, friction rollers simultaneously engaging each disk on opposite sides of the center thereof, and power transmission means connected to the shaft and the friction rollers respectively.

4. In a device of the class described, a shaft, a pair of opposed friction disks mounted on the shaft, friction rollers between and simultaneously engaging the disks, means for forcing one disk toward the other while said disks are rotating, and power transmitting means connected to the shaft and friction rollers respectively.

5. In a device of the class described, a shaft, a pair of friction disks mounted upon the shaft, friction rollers interposed between the disks and bearing thereon, one of the disks being keyed on the shaft, means including a pair of levers and a cone sleeve for forcing the last named disk toward the other, and power transmitting means connected to the shaft and friction rollers respectively.

6. In a machine of the class described, a shaft, a pair of friction rollers simultaneously engaging both disks on opposite sides of the respective centers thereof, and power transmitting means connected to the shaft and to the friction rollers respectively.

7. In a device of the class described, a shaft, a pair of opposed friction disks mounted thereon, pairs of friction rollers engaging both disks on opposite sides of their respective centers, the members of each pair engaging each other, and power transmitting means connected to the shaft and power transmitting means respectively.

8. In a device of the class described, a shaft, a pair of opposed friction disks mounted thereon, pairs of friction rollers engaging both disks on opposite sides of their respective centers, driven shafts and gearing connecting said friction rollers to the last named shafts.

9. In a device of the class described, a shaft, opposed friction disks mounted thereon, pairs of friction rollers engaging both disks on opposite sides of the respective centers of the latter, and adjustable toward and from the centers of the disks, means for adjusting the rollers, and power transmitting means connected to the shaft and friction rollers respectively.

10. In a device of the class described, a power shaft, a pair of opposed friction disks mounted thereon, pairs of friction rollers engaging both disks on opposite sides of the respective centers of the latter, shafts upon which said rollers are splined, means for adjusting the rollers along said shafts, and connections from the shafts for transmitting power therefrom.

11. In a device of the class described, a power shaft, a pair of opposed friction disks thereon, pairs of friction rollers engaging said disks on opposite sides of their respective centers, shafts upon which the friction rollers are splined, means for adjusting the rollers on said shafts toward and from the centers of the disks, gears upon said roller shafts a pair of driven shafts each having a gear thereon, and intermediate gearing connecting the same with the gears on the roller shafts.

12. In a device of the class described, a power shaft, a pair of opposed friction disks on said shaft, pairs of friction rollers engaging both disks on opposite sides of the respective centers thereof, shafts upon which said disks are splined, means common to each pair of rollers for adjusting the same longitudinally of their shafts, and power transmitting means connected to said shafts.

13. In a device of the class described, a power shaft, a pair of opposed friction disks on said shaft, pairs of friction rollers engaging both disks on opposite sides of the respective centers thereof, shafts upon which said disks are splined, means common to the pairs of rollers for adjusting the same longitudinally of their shafts, a shaft common to the rollers of each pair and gearing between said common shaft and the shafts of the rollers.

14. In a device of the class described, a power shaft, a pair of opposed friction disks mounted on the shaft, pairs of friction rollers engaging both disks on opposite sides of their respective centers, shafts upon which said rollers are splined, means common to the pairs of rollers for adjusting the same longitudinally of their shafts, an operating rod, connections therefrom to said adjusting means, and power transmitting means connected to said roller shafts.

15. In a device of the class described, a power shaft, a pair of opposed friction disks thereon, pairs of friction rollers engaging both disks on opposite sides of the respective centers thereof, a pivoted frame in which each pair of rollers is mounted, means for swinging said frame to bring the respective rollers of each pair into and out of contact with the opposed disks, and power transmitting mechanism connected to said rollers.

16. In a device of the class described, a power shaft, a pair of opposed friction disks thereon, pairs of friction rollers engaging both disks on opposite sides of the respective centers thereof, a pivoted frame in which each pair of rollers is mounted, means for swinging said frame to bring the respective rollers of each pair into and out of contact with the opposed disks, and to reverse the contacts of the rollers with said disks.

17. In a device of the class described, a power shaft, a pair of friction disks mounted upon the same, pairs of friction rollers engaging both disks on opposite sides of their respective centers, a pivoted frame in which each pair of rollers is mounted, means for swinging said frame adapted to bring the rollers of each pair into and out of contact with the opposed disks and to reverse the contacts of the rollers with said disk.

18. In a device of the class described, a power shaft, a pair of friction disks mounted upon the same, pairs of friction rollers engaging both disks on opposite sides of their respective centers, a pivoted frame in which each pair of rollers is mounted, means for swinging the frame adapted to bring the rollers of each pair into and out of contact with the opposed disks and to reverse the contacts of the rollers with said disks, a shaft concentric with the pivot of each frame and gearing intermediate the latter shaft and the respective rollers.

19. In a device of the class described, a power shaft, a pair of opposed friction disks mounted thereon, a pair of frames revolubly mounted between the disks perpendicularly to the drive shaft, a pair of friction rollers in each frame and adjustable toward and from the center of the friction disks, means for adjusting the rollers, and power-transmitting means connected to the rollers.

20. In a device of the class described, a power disk, a pair of opposed friction rollers mounted thereon, a pair of frames revolubly mounted between the disks and on axes perpendicular to the power shaft, a pair of shafts mounted in each frame parallel to the axis thereof, a pair of friction rollers splined upon each shaft and power transmitting means connected to each of said roller shafts.

21. In a device of the class described, a power shaft, a pair of opposed friction disks mounted thereon, a pair of frames revolubly mounted between the disks and on axes perpendicular to the power shaft, a pair of shafts mounted in each frame parallel to the axis thereof, a friction roller splined upon each shaft and a driven shaft concentric with the axis of each pivoted frame and gearing connecting such driven shaft with each of the roller shafts.

22. In a device of the class described, a power shaft, a pair of opposed friction disks mounted thereon, a pair of frames revolubly mounted between the disks and on axes perpendicular to the power shaft, a pair of shafts mounted in each frame parallel to the axis thereof, a friction roller splined upon each shaft, a driven shaft concentric with the axis of each pivoted frame, a gear on said shaft, gears on the roller shafts and gearing intermediate the gear on the driven shaft and the gears on the roller shafts whereby the driven shaft is turned in the same direction from each of the friction rollers.

23. In a device of the class described, a drive shaft, a pair of opposed friction disks mounted thereon, a pair of pivoted frames mounted between the friction disks on axes perpendicular to the drive shaft and on opposite sides thereof, a pair of spring-pressed shafts mounted in each frame parallel to the axis thereof, friction rollers mounted upon such shafts, a driven shaft journaled concentrically with respect to each pivoted frame and gearing between the driven shaft and said roller shafts.

24. In a device of the class described, a drive shaft a pair of opposed friction disks mounted thereon, a pair of frames revolubly mounted between said disks on axes perpendicular to the drive shaft, a pair of friction rollers mounted in each frame, a driven shaft and connection from said rollers to the driven shaft and means for forcing the friction disks toward each other.

25. In a device of the class described, a drive shaft a pair of opposed friction disks mounted thereon, a pair of frames revolubly mounted between said disks on axes perpendicular to the drive shaft, a pair of friction rollers mounted in each frame, a driven shaft and connections from said rollers to the driven shaft, a sleeve upon the drive shaft adapted to bear against one of the disks, levers and links connected to the sleeve and driving shaft respectively and means for actuating the levers to force the said sleeve in the direction of the disk against which it bears.

26. In a device of the class described, a drive shaft, a pair of opposed friction disks thereon, a pair of frames revolubly mounted between said disks on opposite sides of and on an axes perpendicular to the driving shaft, a pair of shafts in each of said frames parallel to the axis of the latter, friction rollers mounted on the shafts, a housing into which the shafts extend, a driven shaft also extending into said housing and gearing intermediate the driven shaft and the roller shafts.

27. In a device of the class described, a drive shaft, a pair of opposed friction disks thereon, a pair of frames revolubly mounted between said disks on opposite sides of and on an axis perpendicular to the driving shaft, a pair of shafts in each of said frames parallel to the axis of the latter, friction rollers mounted on the latter shafts, a driven shaft forming one of the bearings for said frame and gearing between said shaft and the roller shafts.

28. In a device of the class described, a drive shaft, a pair of opposed friction disks thereon, a pair of frames revolubly mounted between said disks on opposite sides of and on an axis perpendicular to the driving shaft, driven shafts forming the outer journals for said frames and gearing between said shaft and the roller shafts, a gear fixed to each of said frames, oppositely moving racks coöperating with said gears and means for operating the racks.

29. In a device of the class described, a driving shaft, a pair of opposed friction disks mounted thereon, a pair of frames revolubly mounted between such friction disks on opposite sides of the driving shaft and on axes perpendicular thereto, a pair of shafts in each frame extending parallel to the axis thereof, roller disks keyed upon such shafts, a driven shaft concentric with the axis of the frame, gearing between the driven shaft and the shafts in the frame, friction rollers adjustable longitudinally of such shafts and means for adjusting the friction rollers.

30. In a device of the class described, a driving shaft, a pair of opposed friction disks mounted thereon, a pair of frames revolubly mounted between such friction disks on opposite sides of the driving shaft and on axes perpendicular thereto, a pair of shafts in each frame extending parallel to the axis thereof, roller disks keyed upon such shafts, a driven shaft concentric with the axis of the frame, gears between the driven shaft and the shafts in the frame, friction rollers adjustable longitudinally of such shafts, a disk parallel and connected to the friction rollers and revoluble with the frame, means engaging the disk and with reference to which it is revoluble for adjusting the same toward and from the drive shaft and connections for operating said means.

31. In a device of the class described, a drive shaft, a pair of opposed friction disks mounted thereon, a pair of frames pivoted between the friction disks on opposite sides of the drive shaft and on an axis perpendicular thereto, a pair of shafts mounted in each frame parallel to the axis thereof, a driven shaft concentric with the axis of each frame, gearing connecting the driven shaft with the frame shafts, friction rollers splined on said frame shafts, means for adjusting the friction rollers toward and from the main shaft and means for angularly adjusting the frames to bring the friction rollers to a neutral position or to reversed positions in contact with the friction disks.

32. In a transmission mechanism for automobiles and the like, a drive shaft, a pair of friction disks mounted thereon for revolution therewith, an abutment on the shaft for limiting the movement of one of the friction disks, means mounted upon the shaft for adjusting the second disk toward the first mentioned disk, a driven shaft and friction rolls between the disks geared to said driven shaft mounted between and adapted to be driven by the friction disks.

33. In a transmission mechanism for automobiles and the like, a drive shaft, a pair of friction disks mounted thereon for revolution therewith, an abutment on the shaft for limiting the movement of one of the friction disks, means mounted upon the shaft for adjusting the second disk toward the first mentioned disk, a pair of friction rolls geared to the driven shaft arranged between the friction disk and bearing upon each other and the friction disks.

34. In a transmission mechanism for automobiles and the like, a driving shaft, a pair of revolubly movable friction disks mounted upon the shaft, means mounted wholly upon the shaft for forcing the disks toward each other, pairs of friction rollers mounted between and adapted to bear upon the friction disks, and driven shafts geared to said rolls.

35. In a transmission mechanism for automobiles and the like, a driving shaft, a pair of relatively adjustable friction disks mounted upon the shaft, pairs of friction rolls between the disks and on opposite sides of the power shaft, means for adjusting the friction rolls toward and from the power shaft, means for swinging the pairs of rolls into and out of contact with the friction disks, driven shafts and connections from the rolls to the driven shaft.

HARVEY L. FISHER.

Witnesses:
JAMES B. MACAULY,
ROBERT DOBBERMAN.

Copies of this patent may be obtained for five cents each, by addressing the "Commissioner of Patents, Washington, D. C."